(12) United States Patent
Joo

(10) Patent No.: US 7,805,172 B2
(45) Date of Patent: Sep. 28, 2010

(54) COVER FOR A MOBILE DEVICE AND MOBILE DEVICE HAVING SAME

(75) Inventor: Won Seok Joo, Seoul (KR)

(73) Assignee: LG Electronics Inc., Seoul (KR)

( * ) Notice: Subject to any disclaimer, the term of this patent is extended or adjusted under 35 U.S.C. 154(b) by 535 days.

(21) Appl. No.: 11/865,582

(22) Filed: Oct. 1, 2007

(65) Prior Publication Data

US 2008/0227507 A1   Sep. 18, 2008

(51) Int. Cl.
*H04M 1/00*   (2006.01)
(52) U.S. Cl. ............ 455/575.8; 455/575.5; 455/90.3; 455/575.1; 455/348; 379/428.01; 379/433.11; 379/437
(58) Field of Classification Search ............ 455/575.8, 455/550.1, 90.3, 575.1, 575.3, 575.5, 95, 455/344, 346–350; 379/428.01, 433.01–433.04, 379/433.11, 434, 437, 440
See application file for complete search history.

(56) References Cited

U.S. PATENT DOCUMENTS

| 5,819,162 | A | * | 10/1998 | Spann et al. ............. 455/575.5 |
| 6,075,977 | A | * | 6/2000 | Bayrami ................. 455/575.5 |
| 6,359,216 | B1 | * | 3/2002 | Liu ........................... 174/357 |
| 6,711,387 | B1 | * | 3/2004 | Lungley .................. 455/90.3 |
| 6,809,254 | B2 | * | 10/2004 | Clement et al. ............. 174/389 |
| 6,957,051 | B1 | * | 10/2005 | Korisch et al. ............. 455/107 |
| 7,467,001 | B2 | * | 12/2008 | Wu ......................... 455/575.8 |
| 2005/0090299 | A1 | * | 4/2005 | Tsao et al. ............... 455/575.5 |
| 2005/0213249 | A1 | * | 9/2005 | Shimomura ................ 360/137 |

* cited by examiner

*Primary Examiner*—Sujatha Sharma
(74) *Attorney, Agent, or Firm*—Birch, Stewart, Kolasch & Birch, LLP

(57) ABSTRACT

A cover for a mobile device. The cover includes a support member, wherein at least a portion of the support member is transmissive, and a shielding layer located on the support member between the edge and the center of the support member, the shielding layer having at least one region that decreases in opacity from the edge of the support member towards the center of the support member. A mobile device having the cover is also provided.

27 Claims, 5 Drawing Sheets

COVER FOR A MOBILE DEVICE AND MOBILE DEVICE HAVING SAME

CROSS REFERENCE TO RELATED APPLICATIONS

This application claims priority to Korean Application No. 10-2007-0026325, filed Mar. 16, 2007, which is herein incorporated by reference in its entirety.

BACKGROUND OF THE INVENTION

1. Field of the Invention

The present invention relates to a cover for a mobile device and a mobile device having the same, and more particularly, to a cover for a mobile device having a region that decreases in opacity and a mobile device having the same.

2. Description of Related Art

A mobile device, such as a portable phone or a personal digital assistant (PDA), is a portable electronic device that has various functions that allow a user to wirelessly transmit/receive/process the information white being carried by the user.

As telecommunication techniques rapidly develop, the mobile device is being implemented to support multimedia, such as photos, moving images/videos, music, broadcasting, and Internet, as well as, wireless communication. As a result, the mobile device requires an interface for accessing the various information and functions. However, because mobile devices continue to become smaller and lighter, a mobile device with a more enhanced user's interface is required.

BRIEF SUMMARY OF THE INVENTION

Therefore, an object of the present invention is to provide a mobile device capable of enhancing a user's utilization while maintaining a simple appearance.

To achieve these and other advantages and in accordance with the purpose of the present invention, as embodied and broadly described herein, there is provided a cover for a mobile device. The cover includes a support member, wherein at least a portion of the support member is transmissive, and a shielding layer located on the support member between the edge and the center of the support member, the shielding layer having at least one region that decreases in opacity from the edge of the support member towards the center of the support member.

In another aspect, the support member has a front surface and a side surface, and the support member has a curved shape to transition from the front surface to the side surface.

In another aspect, the cover may include a conductive film layer configured to provide an input signal when touched.

In still another aspect, the shielding layer may include a reflecting layer located on the support member, the reflecting layer being configured to partially reflect light incident onto support member, and a printed layer located under the reflecting layer, the printed layer being configured to divide a transparent zone that transmits light and a non-transparent zone disposed at a periphery of the transparent zone.

In a further aspect, the printed layer may be formed by a gradation printing method so that the at least one region decreases in opacity from the edge of the support member towards the center of the support member.

In yet another aspect, the reflecting layer may be a metallic oxide layer.

In another aspect, the cover may include a transparent protection layer located on the printed layer. The transparent protection layer may be integrally molded with the support member by in-mold injection or may be formed by transferring the printed layer onto the support member and then coating a transparent material thereon.

In accordance with another aspect of the present invention, a mobile device is provided. The mobile device includes a cover having a transmissive region and a transition region, the cover having a support member, wherein the transition region decreases in opacity from the edge of the support member towards the center of the support member, and a display module visible through the cover.

In another aspect, the support member has a front surface and a side surface, and the support member has a curved shape to transition from the front surface to the side surface.

In still another aspect, the display module may be one of a flat type and a curved type that conforms to the shape of the cover.

In yet another aspect, the mobile device may include a conductive film layer configured to provide an input signal when touched.

In another aspect, the shielding layer may include a reflecting layer located on the support member, the reflecting layer being configured to partially reflect light incident onto support member, and a printed layer located under the reflecting layer, the printed layer being configured to divide a transparent zone that transmits light and a non-transparent zone disposed at a periphery of the transparent zone.

In a further aspect, the printed layer may be formed by a gradation printing method so that the at least one region decreases in opacity from the edge of the support member towards the center of the support member such that brightness of the display module is darker towards an edge when the display module is turned on.

In still another aspect, the reflecting layer may be a metallic oxide layer.

In another aspect, the mobile device may include a transparent protection layer located on the printed layer. The transparent protection layer may be integrally molded with the support member by in-mold injection or may be formed by transferring the printed layer onto the support member and then coating a transparent material thereon.

In another aspect, the cover may be a front cover that forms a front appearance.

In yet another aspect, the mobile device may include a rear cover that forms a rear appearance.

In a further aspect, the mobile device may include a speaker unit for outputting sound, the speaker unit being located on the rear cover. The speaker unit may be configured to transmit sound by at least one of air trembling and bone conduction.

In another aspect, a hook for coupling the front cover and the rear cover to each other may be provided at each edge of the front cover and the rear cover.

In still another aspect, a side cover configured to partially form a side appearance is may be provided between the front cover and the rear cover.

In yet another aspect, a local area communication module configured to perform a radio communication with an earphone may be located inside the cover.

In still another aspect, the mobile device may include a keypad disposed at one side of the display module for inputting information.

The foregoing and other objects, features, aspects and advantages of the present invention will become more apparent from the following detailed description of the present invention when taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Reference will now be made in detail to the preferred embodiments of the present invention, examples of which are illustrated in the accompanying drawings. Hereinafter, a mobile device according to the present invention will be explained in more detail.

Figure 1:
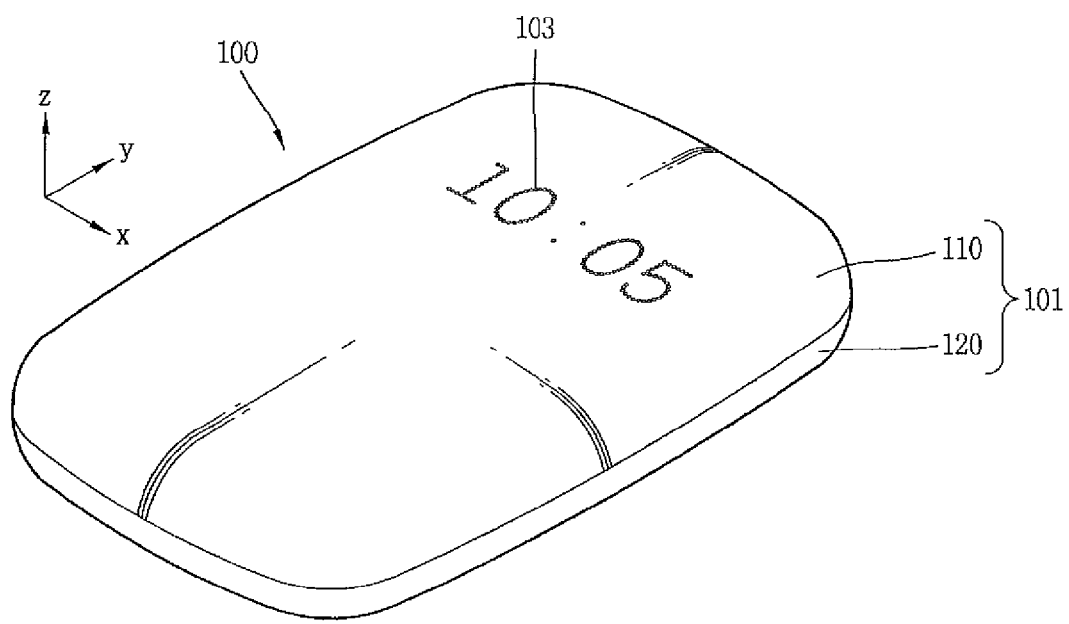
FIG. 1 is a perspective view of a mobile device in a standby or powered-off mode according to a first exemplary embodiment of the present invention.

As shown in FIG. 1, a mobile device 100 has a body 101 having no sharp edge or boundary. The body 101 forms a simple appearance with the combination of a front cover 110 and a rear cover 120. The front side denotes the z-axis direction, and the upper side denotes the y-axis direction in FIG. 1.

The front cover 110 forms a simple curve having no sharp edges to divide a front surface and a side surface from each other. Preferably, a display mode 140 (see FIGS. 4-6) and the front cover 110 do not form a dividing line on a surface of the mobile device 100.

When the mobile device 100 is in a stand-by mode, the mobile device 100 may have a time displaying unit 103. The time displaying unit 103 may be implemented as a liquid crystal display (LCD) device or an organic light emitting diode (OLED) so as to be operated with a low power under a state that the display module 140 is not driven.

Figure 4:
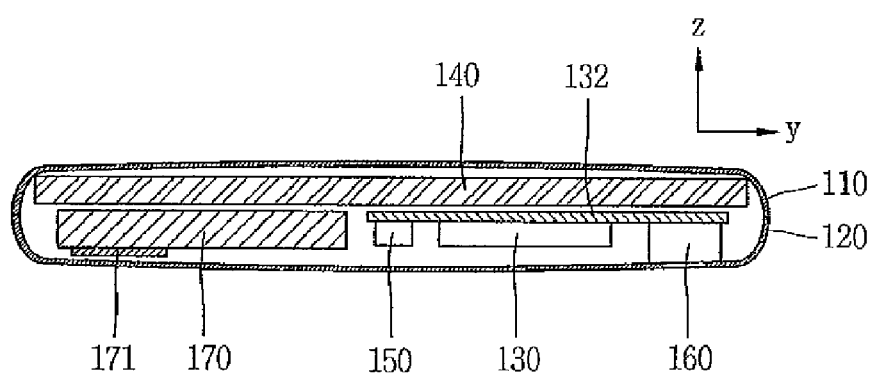
FIG. 4 is a longitudinal section view of the mobile device of FIG. 1.

As seen in FIG. 4, the display module 140 is located behind the front cover 110. The display module 140 may be implemented as an LCD device having an excellent portability, and having low power consumption due to a low operation voltage. The display module 140 may be a flat type, or may be a curved type attached to the front cover 110 (see FIG. 7).

An RF module 130 having an antenna and other components for mobile communication and a circuitry supporting substrate, such as a printed circuit board (PCB) 132 having components for a central processing may be provided in the mobile device 100.

A local area communication module 150 for performing a radio communication with an earphone may be provided at the PCB 132 so as to not require a connection device, such as a hole, a bump, or an interruption in the surface of the front cover 110 and the rear cover 120. The local area communication module 150 may be implemented as a BLUETOOTH or an infrared data association (IrDA), each using a communication standard, or may be implemented as an antenna for a radio frequency identification (RFID) and a circuit.

A receiver or a speaker 160 for outputting sound is disposed in the rear cover 120. The receiver or the speaker 160 may be operated to transmit sound by trembling air. A user call receive a call with the mobile device 100 contacting onto his ear without rotating the mobile device 100 in upper and lower directions. Accordingly, the user's convenience is enhanced.

As opposed to the conventional mobile device where the speaker is disposed at a front upper end, the speaker 160 is disposed at a rear surface of the mobile device 100 in the present invention. Accordingly, an area of the display module 140 can be increased. As shown in FIG. 4, the display module 140 is disposed so as to be nearly adhered to an upper end of the front cover 110. The display module 140 having an increased area provides more visual information, thereby allowing the user to recognize an image of a high resolution.

As another embodiment, the speaker 160 may be operated in a bone conduction manner so that sound can be transmitted even while the speaker 160 contacts the user's ear via the mobile device 100. Once the speaker 160 is operated, vibration of the speaker 160 is transmitted to the front cover 110 and the rear cover 120. Then, the vibration is transmitted to the user's brain by the user's facial bones/ear bones, which indirectly contacts the front cover 110 or the rear cover 120. Accordingly, the user can recognize the vibration as sound.

As opposed to a general sound system, which utilizes air as a medium between the mobile device and the user, the bone conduction method does not require an air hole through which air is introduced or discharged out, thereby implementing a simple appearance of the mobile device.

Referring to FIG. 4, a battery 170 for supplying power to the mobile device 100 is disposed at a rear side of the display module 140. The battery 170 may be a detachable type, or a fixed type requiring no insertion opening. The battery 170 may require a contact charging port that performs charging by being connected to an external wire, or a non-contact charging port 171 that performs charging without being directly connected to an external source. The non-contact charging port 171 has a coil to perform a charging by a current induced by a magnetic field of a coil wound on a charger (not shown).

When a camera (not shown) is to be located in the mobile device, the camera may be disposed at an inner side of the rear cover 120 to prevent a complicated appearance of the mobile device.

Figure 2:
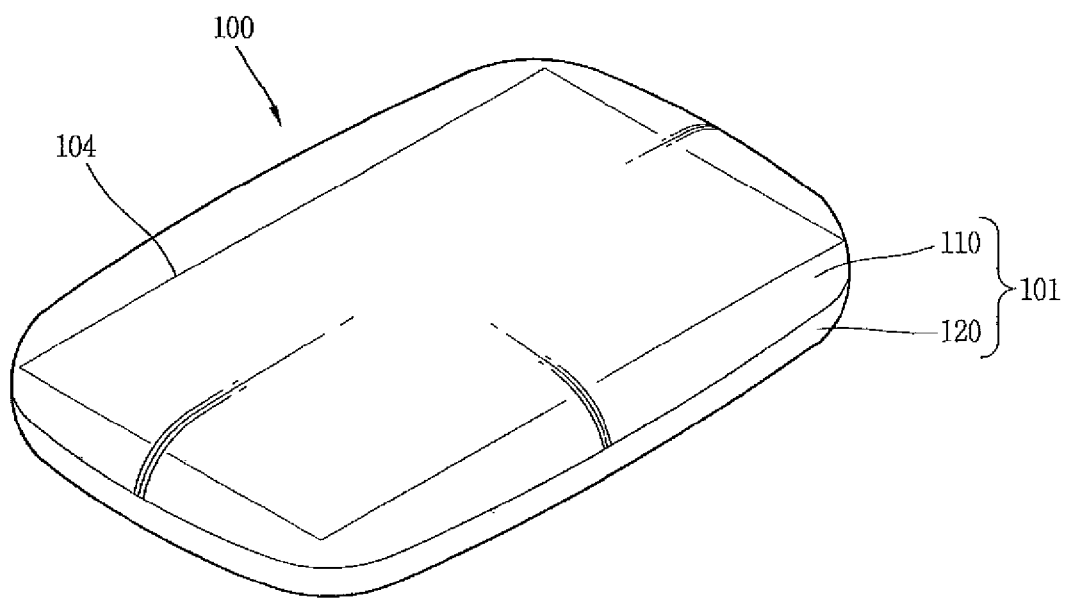
FIG. 2 is a perspective view of the mobile device of FIG. 1 in a turned on mode.

As seen in FIG. 2, when power is supplied to the display module 140 of the mobile device 100 because it has been either powered-on or exited a standby-by mode, a screen 104 outputted from the display module 140 is displayed on the front cover 110. However, if the screen 104 is turned off, the boundary for dividing a displayed zone on the screen and a non-displayed zone from each other is not seen as shown in FIG. 1.

Figure 5:
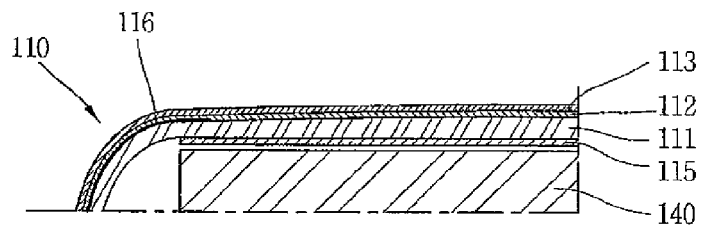
FIG. 5 is an enlarged partial section view of a front cover of the mobile device of FIG. 4.
Figure 6:
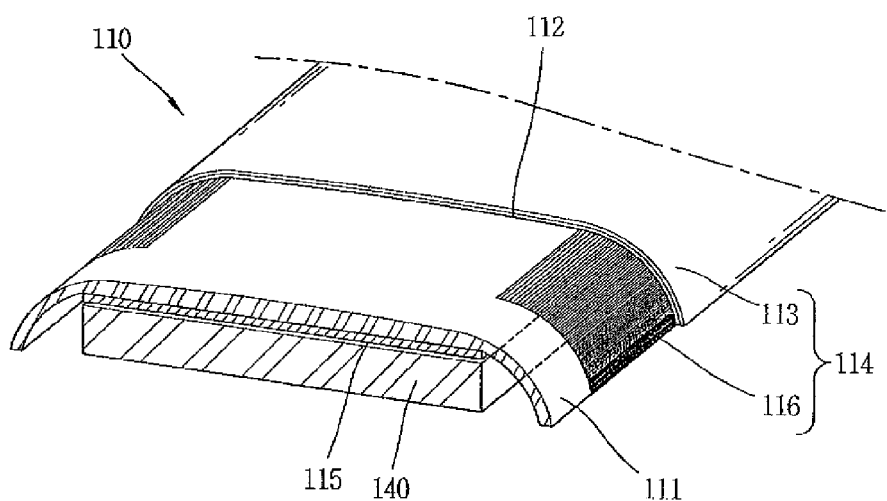
FIG. 6 is a partial perspective view of the front cover of the mobile device of FIG. 4.
Figure 7:
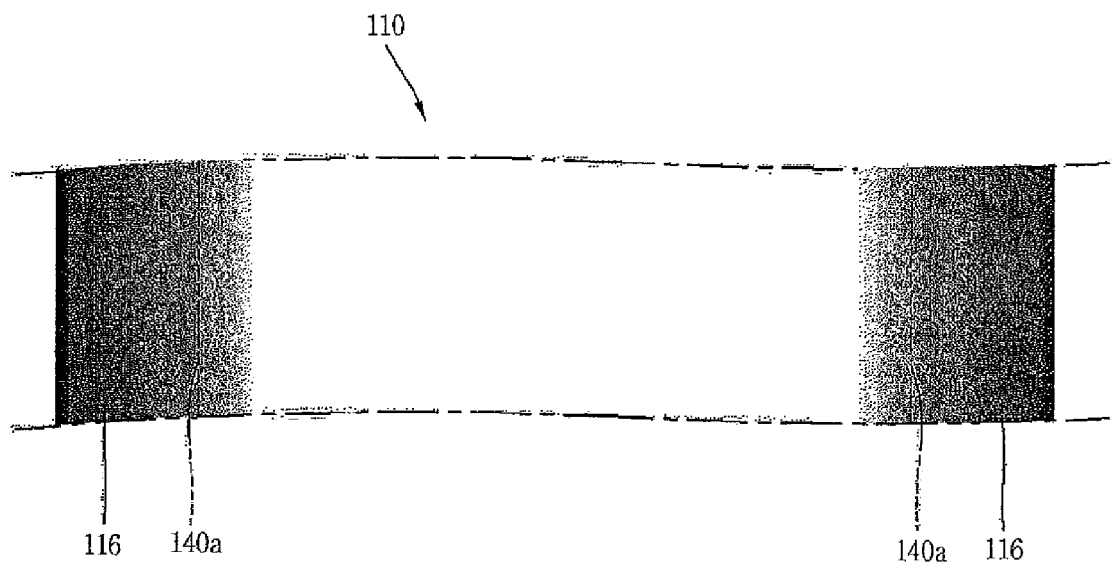
FIG. 7 illustrates a base cover and a printed layer of FIG. 5 in an unfolded configuration.

As shown in FIGS. 5-7, the front cover 110 has a support member or base cover 111 having no sharp edge to divide a front surface and a side surface of the base cover 111 from each other. A shielding layer 114 is provided on the base cover 111 for removing a boundary between a displayed zone and a non-displayed zone on the screen 104 when the mobile device 100 is in a standby mode or when power is turned off. As such, the shielding layer 114 may also be referred to as a boundary-shielding layer.

The base cover 111 may be formed of a light transmissive material, and is preferably formed to have a thickness to maintain a predetermined rigidity so as to support each touch. Herein, the term of transmissive can be understood as ranging from fully transmissive to almost completely opaque.

The boundary-shielding layer 114 includes a reflecting layer 113 formed at an upper side thereof and a printed layer 116 disposed at a lower side of the reflecting layer 113. The printed layer 116 may be attached to the base cover 111.

In order to remove a boundary between a displayed zone and a non-displayed zone on the screen 104 when the mobile device is in a standby mode or power is turned off, the printed layer 116 divides a transparent zone that transmits light outputted from the display module 140 and a non-transparent zone such that the opacity decreases from the edge of the base cover 111 to the center of the base cover 111. As seen in FIG. 6, the printed layer 116 is formed by a gradation printing manner so that transmissivity between a transparent zone and a non-transparent zone can be gradually changed.

More specifically, as shown in FIG. 7, the printed layer 116 becomes brighter towards the center of the base cover 111 and becomes darker towards the edge of the base cover 111. Accordingly, the edge 140a of the display module 140 is partially seen. The printed layer 116 is implemented so that light outputted from the display module 140 can become darker towards the edge of the screen when the display module 140 is turned on.

A transparent protection layer 112 for protecting the printed layer 116 may be attached onto the printed layer 116. The transparent protection layer 112 may be formed by in-molding a transparent resin film. Once the printed layer 116 has been printed onto the transparent resin film, the transparent resin film is integrally molded onto the base cover 111. Accordingly, the transparent resin film serves as the transparent protection layer 112.

Alternatively, the printed layer 116 may have been printed onto a film and transferred onto the base cover 111. Then, the film may be removed, and a transparent material may be coated onto the printed layer 116. Herein, the coated transparent material serves as the transparent protection layer 112.

The reflecting layer 113 is disposed on the printed layer 112 and, together with the printed layer 116, effectively removes the boundary between the displayed zone and the non-displayed zone by partially reflecting light incident onto the base cover 111. Preferably, the reflecting layer 113 may be formed of a metallic oxide. Although not shown, the transparent protection layer 112 may be formed on the reflecting layer 113.

As shown in FIGS. 5 and 6, a conductive film layer 115 for sensing keys inputted to the mobile device 100 in a touch manner is disposed at the base cover 111. The conductive film layer 115 may be implemented by providing an indium-tin-oxide (ITO) film at an inner surface of the base cover 111, thereby sensing a capacitance change due to touch. Alternatively, the conductive film layer 115 may be implemented as two ITO films having a certain space therebetween, thereby sensing a capacitance change due to touch.

Figure 3:
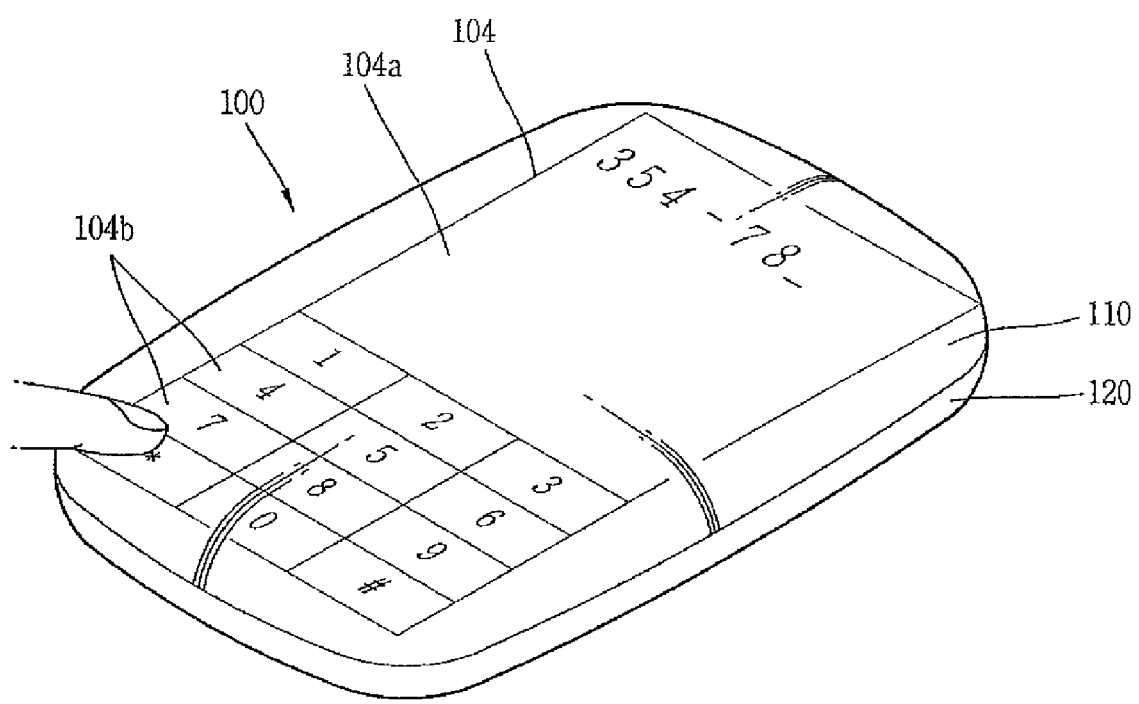
FIG. 3 is a perspective view of the mobile device of FIG. 1 being used by touching a cover of the mobile device.

As shown in FIG. 3, when the mobile device 100 is in a dialing mode, the screen 104 may consist of a number inputting screen 104b for inputting numbers, and a number displaying screen 104a for displaying inputted numbers. A user can dial by touching each number positioned on the number inputting screen 104b.

Figure 8:
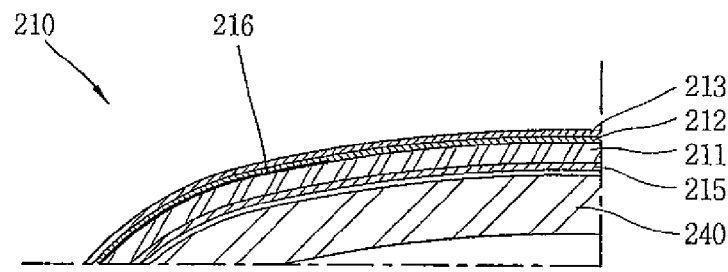
FIG. 8 is an enlarged partial section view of a second exemplary front cover of a mobile device.

As shown in FIG. 8, a second exemplary front cover of a mobile communication device is provided. In this exemplary embodiment, a display module 240 and a conductive film layer 215 are respectively formed to have a shape corresponding to a curved shape of the front cover 210. As a result, a side surface of the display module 240 can be seen at the side surface of the front cover 210. Herein, signals can be inputted to the mobile device in a side touch manner.

Figure 9:
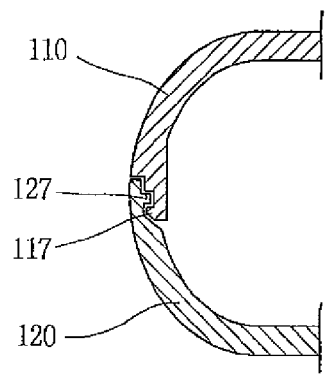
FIG. 9 is a partial section view of a first exemplary connection of a cover of a mobile device.

As seen in FIG. 9, hooks 117, 127 for coupling the front cover 110 and the rear cover 120 to each other by a snap arrangement may be further provided at each edge of the front cover and the rear cover, respectively. This configuration differs from the conventional method where a screw hole is formed at a rear surface of the mobile device, thereby implementing a simple appearance. Once the front cover 110 and the rear cover 120 are coupled to each other, only the edges of the front cover 110 and the rear cover 120 are exposed.

Figure 10:
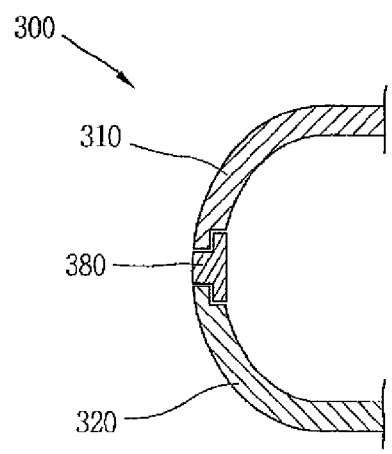
FIG. 10 is a partial section view of a second exemplary cover of a mobile device.

As shown in FIG. 10, a mobile device 300 includes a front cover 310 having no sharp edges between a front surface and a side surface, a rear cover 320, and a side cover 380 for partially forming a side appearance between the front cover 310 and the rear cover 320. The side cover 380 may extend inwardly to serve as a frame for supporting the front cover 310, rear cover 320, as well as internal components of the mobile device 300.

Figure 11:
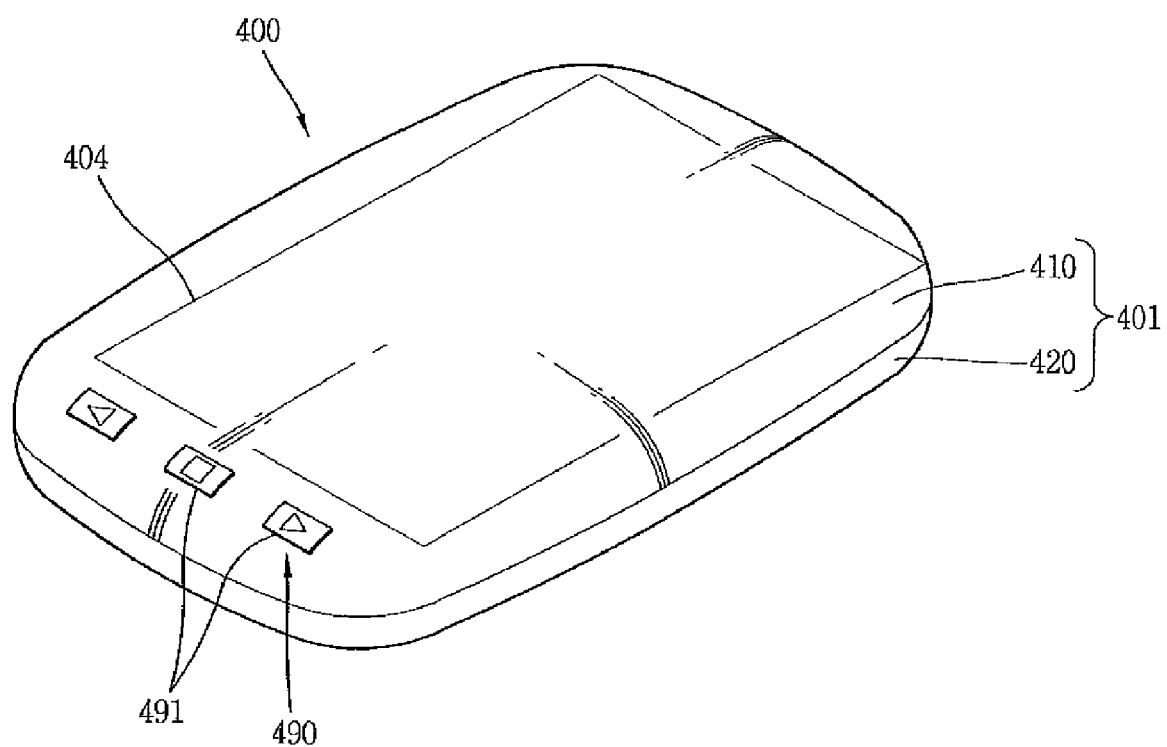
FIG. 11 is a perspective view of a mobile device according to a second exemplary embodiment of the present invention in a turned on mode.

As shown in FIG. 11, a mobile device 400 includes a body 401, a display 404 for displaying visual information, and a keypad 490 for inputting signals.

The keypad 490 may include one or more keys 491, such as a calling key, a direction controlling key, etc., so as to effectively utilize the display 404 having a large area. The keypad 490 may be implemented in a touch manner or in a press manner.

As aforementioned, the mobile device according to the present invention is not provided with an edge for dividing a front surface and a side surface from each other, and a boundary between a displayed zone and a non-displayed zone on the screen is removed when the mobile device is in a standby mode or when power is turned off. Accordingly, the mobile device has a simple appearance, and the user's utilization degree is enhanced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A cover for a mobile device, the cover comprising:
   a support member, wherein at least a portion of the support member is transmissive; and
   a shielding layer located on the support member between the edge and the center of the support member, the shielding layer having at least one region that decreases in opacity from the edge of the support member towards the center of the support member.

2. The cover of claim 1, wherein the support member has a front surface and a side surface, and the support member has a curved shape to transition from the front surface to the side surface.

3. The cover of claim 1, further comprising a conductive film layer configured to provide an input signal when touched.

4. The cover of claim 1, wherein the shielding layer comprises:
   a reflecting layer located on the support member, the reflecting layer being configured to partially reflect light incident onto support member; and
   a printed layer located under the reflecting layer, the printed layer being configured to divide a transparent zone that transmits light and a non-transparent zone disposed at a periphery of the transparent zone.

5. The cover of claim 4, wherein the printed layer is formed by a gradation printing method so that the at least one region decreases in opacity from the edge of the support member towards the center of the support member.

6. The cover of claim 4, wherein the reflecting layer is a metallic oxide layer.

7. The cover of claim 4, further comprising a transparent protection layer located on the printed layer.

8. The cover of claim 7, wherein the transparent protection layer is integrally molded with the support member by in-mold injection.

9. The cover of claim 8, wherein the transparent protection layer is formed by transferring the printed layer onto the support member and then coating a transparent material thereon.

10. A mobile device comprising:
    a cover having a transmissive region and a transition region, the cover having a support member, wherein the transition region decreases in opacity from the edge of the support member towards the center of the support member; and
    a display module visible through the cover.

11. The mobile device of claim 10, wherein the support member has a front surface and a side surface, and the support member has a curved shape to transition from the front surface to the side surface.

12. The mobile device of claim 10, wherein the display module is one of a flat type and a curved type that conforms to the shape of the cover.

13. The mobile device of claim 10, further comprising a conductive film layer configured to provide an input signal when touched.

14. The mobile device of claim 10, wherein the shielding layer comprises:
    a reflecting layer located on the support member, the reflecting layer being configured to partially reflect light incident onto support member; and
    a printed layer located under the reflecting layer, the printed layer being configured to divide a transparent zone that transmits light and a non-transparent zone disposed at a periphery of the transparent zone.

15. The mobile device of claim 14, wherein the printed layer is formed by a gradation printing method so that the at least one region decreases in opacity from the edge of the support member towards the center of the support member such that brightness of the display module is darker towards an edge when the display module is turned on.

16. The mobile device of claim 14, wherein the reflecting layer is a metallic oxide layer.

17. The mobile device of claim 14, further comprising a transparent protection layer located on the printed layer.

18. The mobile device of claim 17, wherein the transparent protection layer is integrally molded with the support member by in-mold injection.

19. The mobile device of claim 17, wherein the transparent protection layer is formed by transferring the printed layer onto the support member and then coating a transparent material thereon.

20. The mobile device of claim 10, wherein the cover is a front cover that forms a front appearance.

21. The mobile device of claim 20, further comprising a rear cover that forms a rear appearance.

22. The mobile device of claim 21, further comprising a speaker unit for outputting sound, the speaker unit being located on the rear cover.

23. The mobile device of claim 22, wherein the speaker unit is configured to transmit sound by at least one of air-trembling and bone conduction.

24. The mobile device of claim 21, wherein a hook for coupling the front cover and the rear cover to each other is further provided at each edge of the front cover and the rear cover.

25. The mobile device of claim 21, wherein a side cover configured to partially form a side appearance is further provided between the front cover and the rear cover.

26. The mobile device of claim 10, wherein a local area communication module configured to perform a radio communication with an earphone is located inside the cover.

27. The mobile device of claim 10, further comprising a keypad disposed at one side of the display module for inputting information.

* * * * *